UNITED STATES PATENT OFFICE.

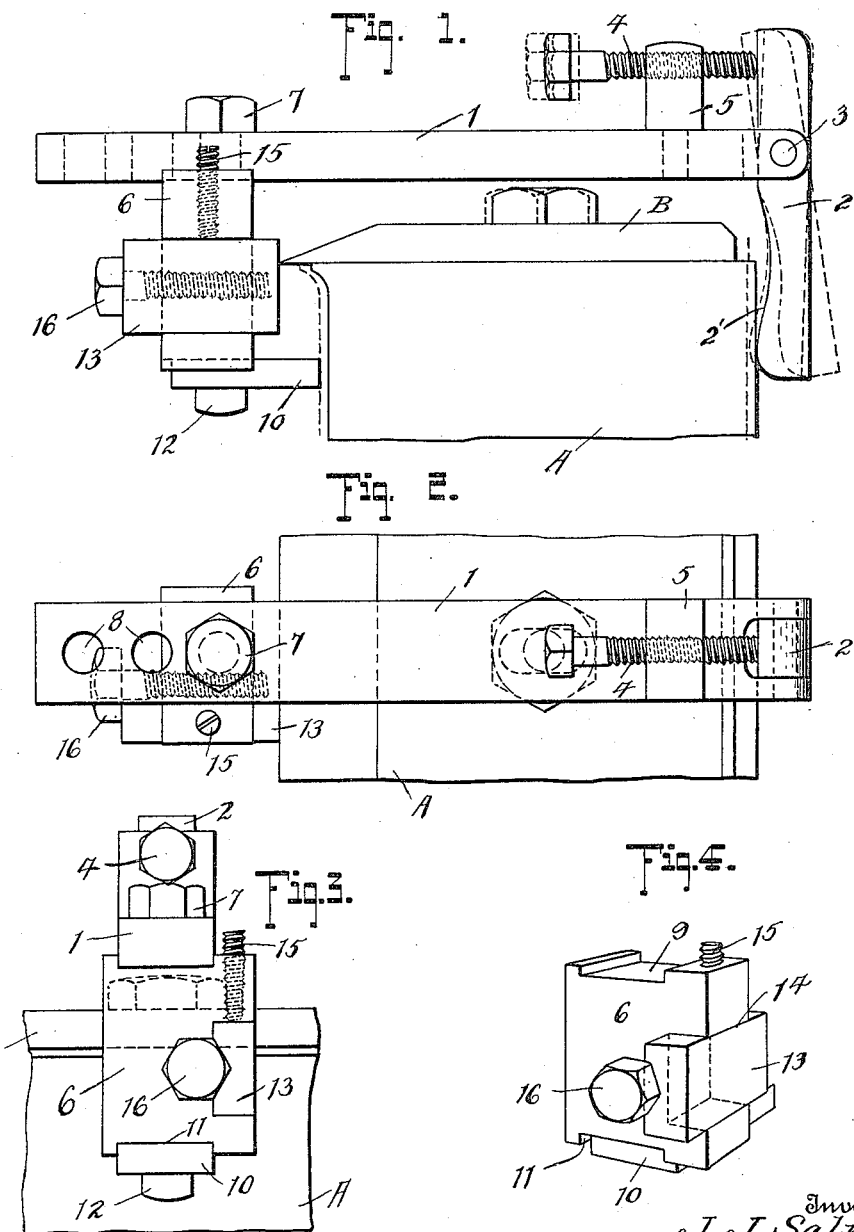

JOSEPH J. SALMER, OF CLINTON, IOWA.

GAGE FOR SETTING CUTTER-HEAD KNIVES.

1,042,280.

Specification of Letters Patent.    Patented Oct. 22, 1912.

Application filed March 2, 1912.  Serial No. 681,100.

*To all whom it may concern:*

Be it known that I, JOSEPH J. SALMER, a citizen of the United States, residing at Clinton, in the county of Clinton and State of Iowa, have invented certain new and useful Improvements in Gages for Setting Cutter-Head Knives, of which the following is a specification.

This invention appertains to gages of that type designed especially for the purpose of setting accurately knives of cutter heads of planers, and similar wood working machines.

The invention involves primarily a peculiar arrangement of gage bar and associated clamp members, whereby the same may be quickly applied to a cutter head, together with an advantageous mounting of the gage member proper which directly coöperates with the knives of the head in the operation of setting the latter.

The clamping means employed is such as to afford a comparatively wide range of adjustment to admit of application of the gage to cutter heads of different shapes in carrying out the purposes of the invention.

For a full understanding of the present invention, reference is to be had to the following description and to the accompanying drawings, in which—

Figure 1 is a side elevation of the gage as applied to a cutter head, the latter being broken away. Fig. 2 is a plan view of the parts shown in Fig. 1. Fig. 3 is an end view of the gage as applied. Fig. 4 is a perspective view of the longitudinal adjustable clamp member.

Throughout the following detail description and on the several figures of the drawings, similar parts are referred to by like reference characters.

The invention is illustrated in the drawings, as applied to a conventional form of cutter head A, which is provided with knives, one of which is shown and denoted B. It is highly desirable in the practice of wood working machines that a very accurate adjustment of the knives B, be secured so as to insure that all the knives will operate in the same path when rotated with the cutter head.

The gage comprising the invention consists primarily of a gage bar 1 of a sufficient length to extend transversely across and project some distance at its opposite ends from opposite side portions of cutter heads of different sizes. Mounted on one end of the bar 1 is a pivoted clamp member 2 having its pivotal support between its ends, as shown at 3, and arranged so that one end projects from one side of the bar 1 for coöperation with an adjusting screw 4. The screw 4 is mounted in a threaded opening provided in a short standard 5 extending upwardly from the bar 1. The opposite end of the clamp member 2 is formed with a curved bearing surface 2' adapted to be engaged with the cutter head A at one side, in the manner shown in Fig. 1. Supported on the opposite end of the gage bar 1 is the clamp member 6, which is of block-like formation and is adapted for adjustment by the provision of a screw member 7 adapted to pass through any one of a series of openings 8 formed in the last mentioned end portion of the bar 1.

The upper portion of the clamp member 6 has a guide groove 9 therein, snugly receiving the adjacent contacting portion of the gage bar 1 and thereby properly positioning this clamp member in respect to said bar. At its lower portion, the clamp member 6 has a cutter head engaging member 10 detachably applied thereto and held in place in a seat 11 on the bottom of said member 6 by means of an attaching screw or equivalent part 12. A gage member or plate 13 is carried by the clamp member 6 intermediate its upper and lower ends and mounted in a seat or recess 14 formed in one side of said member 6. In order to hold the gage member 13 at a proper adjustment, a set screw 15 is provided and is vertically arranged in a threaded opening in that portion of the clamp member 6 just above the seat or recess 14. By turning the screw 15, it will be apparent that the gage member may be securely fastened at an adjustment, or released to facilitate adjustment.

Adjustment of the gage member 13 may be readily effected by the application of a proper tool to an adjusting screw 16 which is mounted in a horizontally threaded opening in the body of the member 6. The head of the screw 16 overlaps the outer end of the gage member 13 and thereby affords an operative contact between the parts 13 and 16 which enables even the very slightest movement to be imparted to the gage member by turning the screw 16 in order to obtain very nice adjustments of the part 13.

The adjustment of the clamp member 6 upon the gage bar 1 through the provision of the openings 8, is needed in order to admit of use of the invention in connection with cutter heads of different sizes. On the other hand, the adjustment of the pivoted clamp member 2, by the screw 4, is used in the application of the gage to a cutter head for which the position of the clamp member 6 will have previously been suitably adjusted if the latter adjustment happens to be necessary in view of the size of said head. The bearing surface 2' of the pivoted clamp member 2 is advantageous in that it adapts itself for the proper engagement with the cutter head at one side, irrespective of the general shape of the head.

The invention is constructed having simplicity in view especially and it will be understood that I do not desire to be limited to the exact construction of the various parts as illustrated since slight modification in the form and arrangement of said parts is contemplated within the purview of the foregoing description and scope of the claims hereto appended.

Having thus described the invention, what is claimed as new is:

1. In a gage of the class described, the combination of a gage bar, a clamp member pivoted between its ends to said bar at one end of the latter, adjustable means coöperating with one end of said clamp member, a second clamp member mounted upon the opposite end portion of the bar, a cutter head engaging member carried by the last mentioned clamp member, and a gage plate adjustable upon the last mentioned clamp member.

2. In a gage of the class described, the combination of a gage bar, a clamp member pivoted between its ends to one end of said bar, an adjusting screw mounted on the bar longitudinally thereof and coöperating with one end of said clamp member, the opposite end of the said clamp member being free to engage the side of a cutter head, a second clamp member adjusted longitudinally of the opposite end portion of the gage bar, a cutter head engaging member carried by the outer end of the second clamp member and arranged opposite the cutter head engaging portion of the first mentioned clamp member, and a gage plate adjustable in a direction parallel with the gage bar and arranged between said gage bar and the cutter head engaging member.

3. In a gage of the class described, the combination of a gage bar, a clamp member pivoted between its ends to one end of said bar, an adjusting screw mounted on the bar longitudinally thereof and coöperating with one end of said clamp member, the opposite end of said clamp member being free to engage the side of a cutter head, a second clamp member provided at its upper portion with a guide groove receiving the adjacent side portion of the gage bar therein, a fastening adjustably securing the second clamp member to the gage bar, a cutter head engaging member detachably applied to the second clamp member at its opposite end, and arranged substantially opposite the cutter head engaging portion of the first mentioned clamp member, the second clamp member being provided with a seat in its side portion at a point between the gage bar and engaging member, a gage plate adjustable longitudinally of the gage bar and arranged in said seat, a set screw for holding the gage plate at a predetermined adjustment, and an adjusting screw mounted transversely in the second clamp member and having its head engaging the gage plate, as set forth.

In testimony whereof I affix my signature in presence of two witnesses.

JOSEPH J. SALMER.

Witnesses:
A. H. PADDOCK,
W. L. DRICKMANN.

Copies of this patent may be obtained for five cents each, by addressing the "Commissioner of Patents, Washington, D. C."